Dec. 14, 1965  J. R. FOSLER  3,223,211
MOTOR CLUTCH AND BRAKE CONTROL FOR DOMESTIC APPLIANCE
Filed Aug. 20, 1963  2 Sheets-Sheet 1

INVENTOR.
John R. Fosler
BY
Frederick M. Ritchie
HIS ATTORNEY

INVENTOR.
John R. Fosler
BY
Frederick W. Ritchie
HIS ATTORNEY

United States Patent Office 3,223,211
Patented Dec. 14, 1965

---

3,223,211
MOTOR CLUTCH AND BRAKE CONTROL FOR DOMESTIC APPLIANCE
John R. Fosler, Dayton, Ohio, assignor to General Motors Corporation, Detroit, Mich., a corporation of Delaware
Filed Aug. 20, 1963, Ser. No. 303,447
6 Claims. (Cl. 192—.044)

This invention relates to a domestic appliance and more particularly to an improved roller drive mechanism for agitating and spinning in a clothes washer.

Roller drive mechanisms, such as taught in the patent to Brucken 3,087,321, issued April 30, 1963, use certain self-energizing rollers as idler members between the motor and the driven member for producing either agitate or spin. Each of these rollers is provided with a resilient tire portion of polyurethane or the like as the motion transmitting surface. During the life of the roller, the tire portion may wear unevenly in a manner to form an undulating or washboard-like surface thereon. When this wear phenomenon occurs, a smooth driving connection is lacking between the drive motor and the driven member and the mechanism becomes noisy due to the added vibration in the system.

Accordingly, it is one object of this invention to provide means for compensating for irregularities on the surface of roller tires in a roller drive mechanism.

As detailed in the Brucken patent, a roller drive mechanism uses the direction of motor rotation for selecting either agitate or spin and a selected idler roller, being self-energizing, is drawn in to form one link in a continuous driving connection between the motor and the respective driven member for effecting agitate or spin. But where the motor is deenergized, such as during a tub spinning operation, the selected roller floats freely, the spin tub brake is applied and two separate rotating systems become involved—the prime mover system including the motor rotor and its power shaft, and the rotatable tub system including the spin and its associated driven member or spin drum assembly including the spin tub brake. Since the mass or rotating inertia of the rotatable tub system is much greater than that of the prime mover system, the tub will tend to spin for a considerable period after the motor rotor has stopped. This creates a problem where the lid of a clothes washer is opened during spin and closed after the motor rotor has stopped but while the tub is still spinning. The motor will be reenergized on its phase winding for high torque operation and the driving connection between the spin tub and the motor will be reestablished with such an impact that damage is likely to occur to the actuating cam for the spin tub brake.

Accordingly, it is another object of this invention to provide a novel impact clutch assembly for a roller drive mechanism.

It is a still further object of this invention to provide an adjustable impact clutch assembly in combination with a roller drive mechanism.

It is a general object of this invention to provide an improved inertia compensated driving connection between the prime mover and a driven member in a roller drive mechanism for minimizing noise in the operation of the mechanism.

A more specific object of this invention is the provision of an impact clutch assembly including inertia means for effecting a smooth driving connection in a roller drive mechanism.

Further objects and advantages of the present invention will be apparent from the following description, reference being had to the accompanying drawings wherein a preferred embodiment of the present invention is clearly shown.

In the drawings:

FIGURE 3 is a sectional view, taken along line 3—3 in FIGURE 2; and

FIGURE 4 is a sectional view, with parts broken away and taken along line 4—4 in FIGURE 2.

Figure 1:
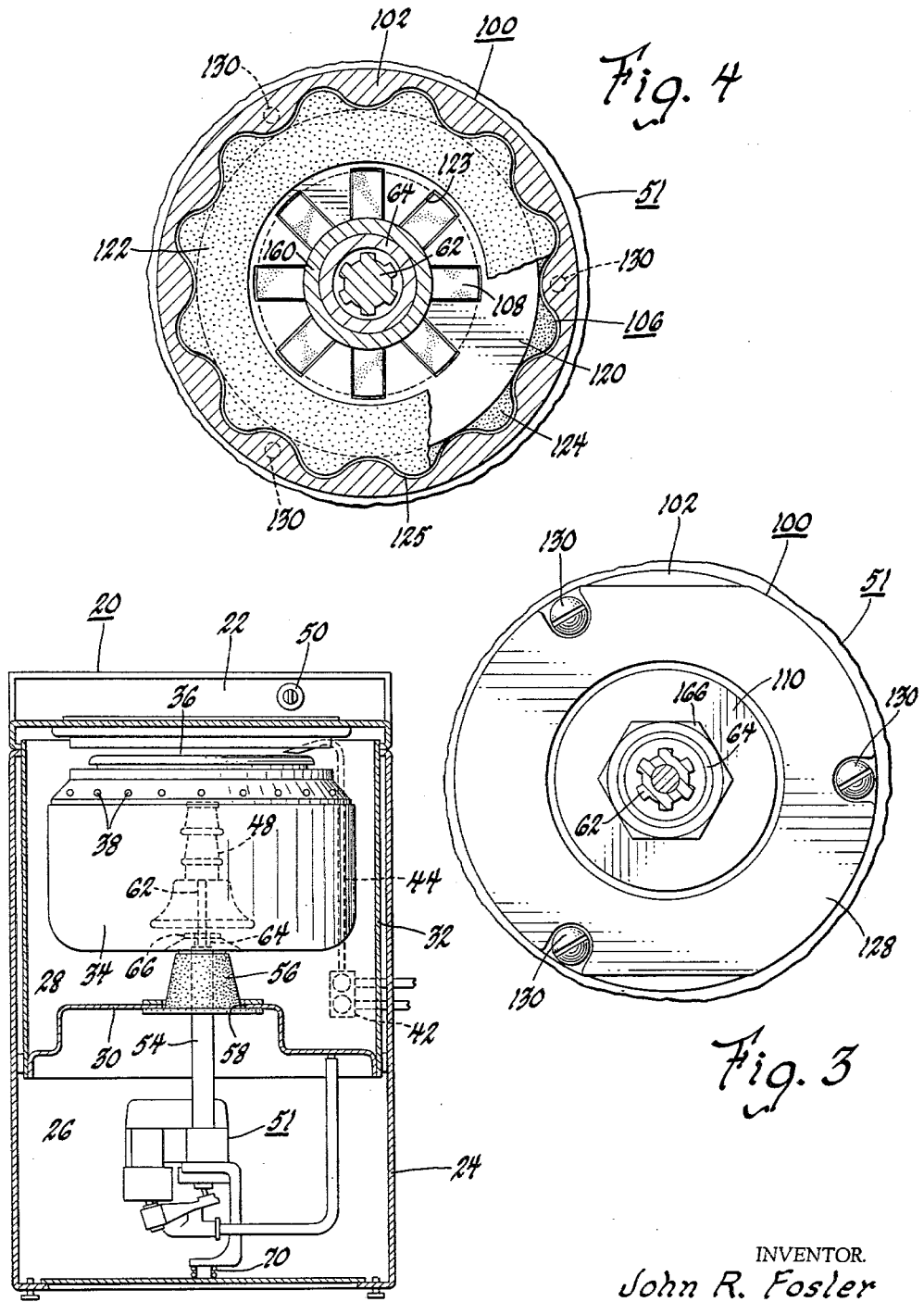
FIGURE 1 is a schematic sectional view, partly in elevation, of a clothes washer provided with the improved roller drive agitate and spin mechanism of this invention.

In accordance with this invention and with reference to FIGURE 1, a clothes washer 20 is comprised of a control housing assembly 22 and a casing 24. The casing 24 is generally divided into a mechanism portion or compartment 26 and a washing compartment or water container chamber 28. A generally centrally located bulkhead 30 separates the mechanism compartment 26 from the water container chamber 28 which is further bounded by a cylindrical water container wall 32. Within the water container 32 is a spin tub 34 having a top opening 36 and a plurality of centrifuging outflow ports 38. The ports 38 are designed to permit the egress of water from the tub 34 when the tub is rotated at high speed. For filling the tub 34 with water a conventional water supply system may be provided with a hot water solenoid actuated valve and a cold water solenoid operated valve 42 which are manifolded into a mixed water supply conduit 44 terminating at a chute overlying the opening 36 of the tub. Within the tub 34, an agitator or pulsator 48 is adapted to reciprocate to circulate or agitate the water admitted through the water supply conduit 44. Thus, clothing placed within the tub 34 is washed as the agitating action of the pulsator 48 causes surging toroidal currents of washing fluid and detergent through the fabric. Conventional sequential operating timer means, shown generally at 50 on the control housing 22, may be included selectively to admit water through the supply conduit 44, to spin the tub 34 and to vertically reciprocate the agitator or pulsator 48.

Prior art roller drive mechanisms for selectively spinning tub 34 and reciprocating an agitator 48 are taught in the aforementioned Brucken patent, in a patent to Sisson 3,060,712 issued October 30, 1962, and in a copending Sisson application Serial No. 128,074 filed July 31, 1961, now Patent 3,174,576 issued March 23, 1965. This invention is directed to an impact clutch assembly for use in combination with these roller drive mechanisms, one of which is shown generally at 51 in FIGURE 1.

The roller drive mechanism 51 is suspended from a stationary shaft enclosing housing portion 54 which is connected to a resilient cup-shaped support member 56. The support member 56, in turn, is affixed to an opening 58 in the bulkhead 30—a suitable sealing gasket being provided to effect a water-tight connection therebetween. Extending upwardly from the stationary enclosing housing 54 is an agitate or pulsate shaft 62 to which the agitator 48 is connected and a spin shaft 64 which is connected as by a tub support nut 66 to the bottom wall of the spin tub 34. In order to dampen excessive gyrating or swinging movement of the agitate and spin mechanism's lower end, a snubber device 70 may be used. For additional details pertaining to the general operation of the roller drive type mechanism, reference may be had to the aforementioned Brucken patent.

Figure 2:
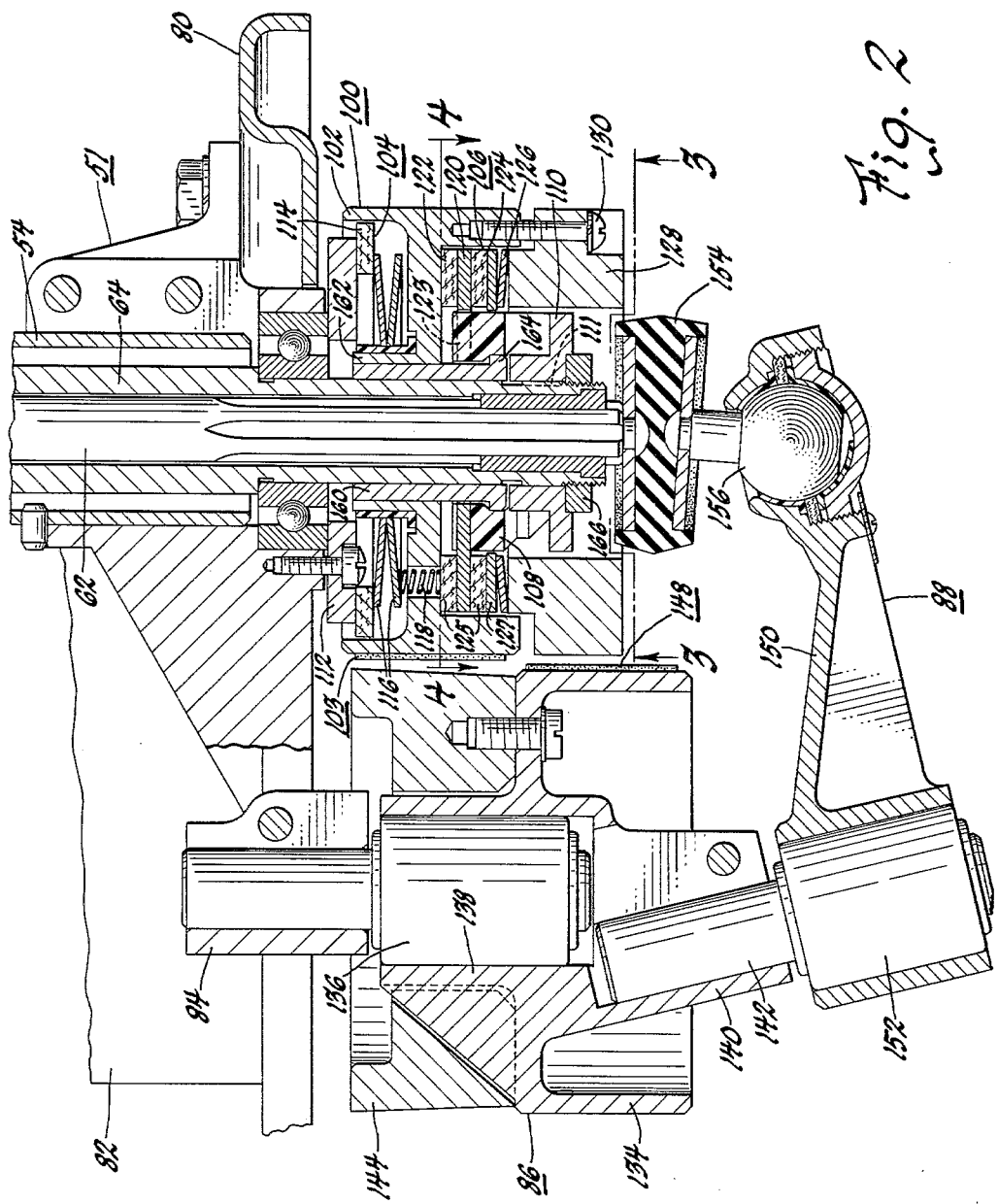
FIGURE 2 is a sectional view of the improved roller drive agitate and spin mechanism, partly in elevation, to show the impact clutch assembly of this invention.

The braking system 104 usable to terminate tub spin in a roller drive is shown in FIGURE 2 as is the impact clutch arrangement of this invention. Note that the shaft enclosing housing 54 is connected to a motor end frame extension or support member 80 which serves to carry a reversible drive motor or prime mover 82 and studs or bosses such as 84 for rotatably carrying an agitate drum assembly 86 and agitate arm assembly 88 which cooperate to reciprocate vertically the agitate shaft 62.

Carried at the bottom of the spin shaft 64 is a spin drive assembly 100 (FIGURE 2). The spin drive assembly 100 is comprised of a spin drum 102, a spin brake subassembly 104 in an upper cavity of the spin drum and an impact safety clutch subassembly 106 in a lower cavity of the spin drum. The spin drum 102, driven by a spin drive idler roller 103, is connected to the spin shaft 64 through a spin drum brake cam or bushing 108 and a spin roll stop 110 as detailed more particularly in the copending application Serial No. 128,074 which is assigned to the same assignee as this invention. In brief and while the spin tub is coasting to a stop, the brake cam 108 rotates relatively to the spin roll stop 110 and, in so doing, is shiftably cammed axially thereto to apply the spin tub brake. To effect a spin driving connection between the motor and the spin tub, the brake cam 108 rotates in the opposite direction relatively to the spin roll stop 110 until the respective camming ramps or teeth lock in a solid driving connection.

The spin brake subassembly 104 is of the disc type which consists of a brake plate 112 mounted on the motor lower end frame or support 80, the brake lining 114 keyed against relative rotation to the spin drum and springs 116 and 118 which are assembled inside the cavity at the top of the spin drum. Two types of springs are used in the brake subassembly. Two spring washers 116 are used to control the loading between the brake lining 114 and the brake plate 112 during the braking period. In addition to the springs 116, three, two-pound coil brake teaser springs 118 are circumferentially arranged about the spin drum 102 and are used to apply a combined constant load of six pounds between the brake lining 114 and the brake plate 112 as the means for rapidly applying full braking force at the conclusion of spin.

The impact safety clutch subassembly 106 of this invention is mounted inside the bottom of the spin drum 102 and is comprised of a clutch plate 120 sandwiched between two clutch linings 122, 124 (FIGURES 2 and 4). The clutch plate 120 is keyed to the top of the spin brake cam 108 as at 123 and the clutch linings are keyed to the spin drum by means of undulating peripheral edges 125.

Pressure is applied to the clutch linings 122, 124 by means of a spring washer 126 which is separated from the clutch lining 124 by a flat washer 127 and held in place by an annular combination inertia and retainer device 128 mounted on the bottom of the spin drum 102. The pressure load on the clutch linings 122, 124 is set by adjusting several screws 130 that mount the retainer on the bottom of the spin drum at a specified torque. This pressure is set so the clutch does not slip under normal operating conditions. However, the clutch can slip to limit the torque the spin drum brake cam 108 can transmit to the spin roll stop 110, and this safety connection thereby eliminates the possibility of severe impact loads on the spin drum brake cam 108. For example, slipping action of the clutch 106 can occur when the electrical circuit to the washer motor 82 is opened by the lid switch (actuated by the opening and closing of the clothes washer access lid) during a spin period and then reclosed before the spin tub 34 comes to a complete stop.

The agitate drum assembly 86 consists of a die cast aluminum wheel 134 with a shaft and bearing assembly 136 pressed into its upper hub 138. The lower hub 140 of the agitate drum forms an inclined socket for the shaft 142 of the agitate arm assembly 88. A cast iron ring 144 is mounted on the top of the agitate drum. This ring adds weight to the agitate drum assembly to assure uniform loading between the agitate drum and its agitate drive idler roller 148. The shaft portion of the agitate drum bearing assembly 136 is mounted into the boss 84 of the motor lower end frame or support 80.

The agitate arm assembly 88 consists of a die cast aluminum arm 150 with a shaft and bearing assembly 152 pressed into one end. The shaft 142 thereof is mounted into the inclined hub of the agitate drum. The opposite end of the agitate arm 150 is connected to the agitate shaft 62 by means of a flexible rubber mount 154. This mount screws into a spherical bearing 156 which is mounted in a socket in the end of the agitate arm 150. Additional details relative to the flexible mount are set forth in the aforementioned Sisson patent 3,060,712.

The stack up of the spin drive assembly is as follows. A spin drum bushing 160 is press fit from the bottom into the top collar 162 of the spin drum, said bushing having a lower annular flange 164 for axially loosely retaining the spin brake cam 108 and the impact clutch assembly 106 in the lower cavity of the spin drum. The brake assembly 104 is seated within the upper spin cavity just covering the teaser springs 118. Then the spin drive assembly is slipped over the lower end of the cylindrical spin shaft 64 and the spin roll stop 110 slipped over the exposed depending end of the spin shaft, a spline 111 preventing relative rotation of the spin roll stop relative to the spin shaft 64. A nut 166 on the spin shaft retains the entire stack up on the spin shaft.

Next, the flexible connector 154 can be threadedly engaged with the tapped end of the agitate shaft 62 and the entire assembly connected to the spherical bearing 156 of the agitate arm assembly 88 as taught more fully in the Sisson patent.

Turning now to FIGURE 2, the agitate roller 148 and the spin roller 103 are shown on the improved roller drive mechanism. Each roller is formed with a polyurethane tire molded onto an aluminum die cast insert (not shown). A rather sloppy fit is effected for each roller so that each roller 103, 148 is free to float about relative to its respective drum 102 or 134 in all directions from the center of the roller. Spin roller 103 is spring biased toward the spin drum 102 and agitate roller 148 is spring biased toward the agitate drum 134. Each roller can then be drawn into a solid driving connection between the motor and its respective drum depending upon the direction of motor operation. This "floating" action of the roller is very essential in the overall operation of the mechanism and is defined as the "self-energizing" characteristic of the rollers in the patent to Brucken 3,087,321 to which reference may be had for further details in this regard. Suffice it at this point to recognize the free-floating characteristic of the polyurethane tired roller gives rise to a scuffing action on the tire surface of the roller which is not in power transmitting relationship. This scuffing occasionally creates an undulated surface on the roller tire which causes inconsistent transmission of drive forces between the roller and its respective drum when the roller is in power transmitting relationship.

Another aspect of this invention is directed to smoothing out the rotation by minimizing the irregularities in the spin roller through the use of an inertia member. In accordance with this invention, the inertia member is provided in the form of the retainer 128 which is given sufficient mass to overcome the bumpy surface of the spin roller, thereby to provide a smooth consistent driven characteristic in the spin drum 102.

It should now be seen that an improved impact clutch assembly has been provided for a self-energizing roller drive mechanism which not only prevents noise and damage to the brake actuating mechanism but also overcomes inconsistent transmission of rotative forces in a roller drive mechanism.

While the embodiment of the present invention as herein disclosed constitutes a preferred form, it is to be understood that other forms might be adopted.

What is claimed is as follows:

1. In combination,
   (a) a washing machine having a spin tub, and a roller drive mechanism for rotating said tub, said mechanism comprising
   (b) a support means,
   (c) a reversible motor supported by said support means,
   (d) spin shaft means connected to said tub and including a spin roll stop,
   (e) a shaft housing affixed to carry said support means and enclosing at least a portion of said spin shaft means,
   (f) a spin drive assembly relatively axially movably supported on said spin shaft means between an upper position and a lower position and including a spin drum, a spin brake subassembly in a dished out upper portion of said spin drum and an impact clutch subassembly in a dished out lower portion of said spin drum,
   (g) said spin brake subassembly including a brake lining rotatable with said spin drum and spring means having a first portion extending between said upper and lower portions of said spin drum and a second portion interposed between said first portion and said brake lining for urging said brake lining into frictionally braking engagement with said support means for stopping the rotation of said tub when said spin drive assembly is in its upper position,
   (h) said impact clutch subassembly being interposed between said spin drum and said spin shaft means for providing a selective driving connection therebetween and including a clutch lining connected to said spin drum and engageable with the first portion of said spring means for limiting the movement of said first portion into said lower portion of said spin drum and including a clutch plate means drivably connected to said spin shaft means and having a cam portion cam actuatingly engageable with said spin roll stop to move said spin drive assembly between said upper and lower positions when said cam portion rotates relative to said spin roll stop,
   (i) said clutch plate means including a clutch plate frictionally engaging said clutch lining and adapted to slip relative to said clutch lining at a predetermined driving torque,
   (j) and a spin roller adapted to be rotatably and spring biasingly, relatively laterally movably supported adjacent said spin drum for self-energizingly positioning itself in power transmitting relationship between said motor and said spin drum when said motor is operating in one direction and adapted to be in spring-biased, lightly scuffing, non-driving, overrun engagement with said spin drum when the motor is operating in the reverse direction,
   (k) said spin roller having a polyurethane tire thereon subjected to irregular wear at the surface thereof when said motor is operating in said reverse direction by the scuffing engagement of said tire with said spin drum,
   (l) said impact clutch subassembly including means for adjusting the frictional engagement of said clutch lining with said clutch plate thereby to control the slip between the spin drum and the spin shaft means at any predetermined driving torque,
   (m) said adjusting means comprising an annular inertia mass coaxial with said spin drum and threaded fastening means adjustably connected to said spin drum and extending through said inertia mass for positioning said inertia mass axially relative to said spin drum,
   (n) said inertia mass having sufficient weight to overcome the effects of said irregular tire wear on the transmission of power from said spin roller to said spin drum thereby to provide smooth acceleration of said spin tub when said motor is operating in said one direction.

2. In combination, a washing machine having a spin tub, and a roller drive mechanism for rotating said tub, said mechanism comprising
   (a) a support means,
   (b) a reversible motor supported by said support means,
   (c) spin shaft means connected to said tub,
   (d) a shaft housing affixed to carry said support means and enclosing at least a portion of said spin shaft means,
   (e) a spin drive assembly relatively axially movably supported on said spin shaft means between an upper position and a lower position and including a spin drum, a spin brake subassembly in a dished out upper portion of said spin drum and an impact clutch subassembly in a dished out lower portion of said spin drum,
   (f) said spin brake subassembly including spring biased means rotatable with said spin drum and adapted to frictionally brakingly engage said support means for stopping the rotation of said tub when said spin drive assembly is in its upper position,
   (g) said impact clutch subassembly being interposed between said spin drum and said spin shaft means for providing a selective driving connection therebetween and including first means connected to said spin drum and second means drivably connected to said spin shaft means and having cam means adapted to move said spin drive assembly between said upper and lower positions when said second means rotates relative to said spin shaft means,
   (h) said second means including means frictionally engaging said first means and adapted to slip relative to said first means at a predetermined driving torque,
   (i) and a spin roller adapted to be rotatably and spring biasingly, relatively laterally movably supported adjacent said spin drum for self-energizingly positioning itself in power transmitting relationship between said motor and said spin drum when said motor is operating in one direction and adapted to be in spring-biased, lightly scuffing, non-driving engagement with said spin drum when the motor is operating in the reverse direction,
   (j) said spin roller having a resilient tire thereon subjected to irregular wear at the surface thereof when said motor is operating in said reverse direction by the scuffing engagement of said tire with said spin drum,
   (k) said impact clutch subassembly including means for adjusting the frictional engagement of said first means with said frictionally engaging means thereby to control the slip between the spin drum and the spin shaft means at any predetermined driving torque,
   (l) said last named means including means relatively axially movably connected to the spin drum and coaxial therewith and having sufficient weight to overcome the effects of said irregular tire wear on the transmission of power from said spin roller to said spin drum thereby to provide smooth acceleration of said spin tub when said motor is operating in said one direction.

3. In combination, a washing machine having a spin tub, and a roller drive mechanism for rotating said tub, said mechanism comprising
   (a) a support means,
   (b) a reversible powershaft supported by said support means,
   (c) spin shaft means connected to said tub,
   (d) a shaft housing affixed to carry said support means and enclosing at least a portion of said spin shaft means,
   (e) a spin drive assembly relatively axially movably supported on said spin shaft means between an upper position and a lower position and including a spin drum, a spin brake subassembly in a dished out upper portion of said spin drum and an interia device extending into a dished out lower portion of said spin drum, (f) said spin brake subassembly including spring biased means rotatable with said spin drum and adapted to frictionally brakingly engage said support means for stopping the rotation of said tub when said spin drive assembly in its its upper position, (g) and a spin roller rotatably and spring biasingly, relatively laterally movably supported adjacent said spin drum for self energizingly positioning itself in power transmitting relationship between said powershaft and said spin drum when said powershaft is operating in one direction and in spring-biased, lightly scuffing, non-driving engagement with said spin drum when the powershaft is operating in the reverse direction, (h) said spin roller having a resilient tire thereon subjected to irregular wear at the surface thereof when said powershaft is operating in said reverse direction by the scuffing engagement of said tire with said spin drum, (i) said inertia device including means relatively axially movably connected to the spin drum and coaxial therewith and having sufficient weight to overcome the effects of said irregular tire wear on the transmission of power from said spin roller to said spin drum thereby to provide smooth acceleration of said spin tub when said powershaft is operating in said one direction.

4. In combination, a washing machine having a spin tub, and a roller drive mechanism for rotating said tub, said mechanism comprising a support means, a reversible powershaft supported by said support means, spin shaft means connected to said tub and carried by said support means, a spin drive assembly relatively axially movably supported on said spin shaft means between an upper position and a lower position and including a spin drum, a spin brake subassembly in a dished out upper portion of said spin drum and an inertia device adjacent a lower portion of said spin drum, said spin brake subassembly including spring biased means rotatable with said spin drum and adapted to frictionally brakingly engage said support means for stopping the rotation of said tub when said spin drive assembly is in its upper position, said inertia device being interposed between said spin drum and said spin shaft means for providing a selective driving connection therebetween, and a spin roller rotatably and spring biasingly, relatively laterally movably supported adjacent said spin drum for self-energizingly positioning itself in power transmitting relationship between said powershaft and said spin drum when said powershaft is operatng in one direction and in spring-biased, lightly scuffing, non-driving engagement with said spin drum when the powershaft is operating in the reverse direction, said spin roller having a resilient tire thereon subjected to irregular wear at the surface thereof when said powershaft is operating in said reverse direction by the scuffing engagement of said tire with said spin drum, said inertia device including means relatively axially movably connected to the spin drum for controlling the selective driving connection between said spin drum and said spin shaft means and having sufficient weight to overcome the effects of said irregular tire wear on the transmission of power from said spin roller to said spin drum thereby to provide smooth acceleration of said spin tub when said powershaft is operating in said one direction.

5. In combination, a washing machine having a spin tub, and a roller drive mechanism for rotating said tub, said mechanism comprising a support means, a reversible powershaft supported by said support means, spin shaft means connected to said tub and carried by said support means, a spin drive assembly supported on said spin shaft means including a spin drum and an inertia device, said inertia device being interposed between said spin drum and said spin shaft means for providing a selective driving connection therebetween, and a spin roller rotatably and spring biasingly, relatively movably supported adjacent said spin drum for self-energizingly positioning itself in power transmitting relationship between said powershaft and said spin drum when said powershaft is operating in one direction and in spring-biased, lightly scuffing, non-driving engagement with said spin drum when the powershaft is operating in the reverse direction, said spin roller having a resilient tire thereon subjected to irregular wear at the surface thereof when said powershaft is operating in said reverse direction by the scuffing engagement of said tire with said spin drum, said inertia device including means relatively movably connected to the spin drum for controlling the selective driving connection between said spin drum and said spin shaft means and having sufficient weight to overcome the effects of said irregular tire wear on the transmission of power from said spin rollers to said spin drum thereby to provide smooth acceleration of said spin tub when said powershaft is operating in said one direction.

6. In combination, a washing machine having a spin tub, and a roller drive mechanism for rotating said tub, said mechanism comprising a support means, a reversible powershaft supported by said support means, spin shaft means connected to said tub and carried by said support means, a spin drive assembly supported on said spin shaft means including a spin drum and an inertia device, said inertia device being interposed between said spin drum in said spin shaft means for providing a selective driving connection therebetween, and a spin roller rotatably and relatively movably supported adjacent said spin drum for self-energizingly positioning itself in power transmitting relationship between said powershaft and said spin drum when said powershaft is operating in one direction and in lightly scuffing, non-driving engagement with said spin drum when the powershaft is operating in the reverse direction, said spin roller having a resilient tire thereon subjected to irregular wear at the surface thereof when said powershaft is operating in said reverse direction by the scuffing engagement of said tire with said spin drum, said inertia device including means connected for movement relative to the spin drum for controlling the selective driving connection between said spin drum and said spin shaft means and having sufficient mass to overcome the effects of said irregular tire wear on the transmission of power from said spin roller to said spin drum thereby to provide constant rate acceleration of said spin tub when said power shaft is operating in said one direction.

References Cited by the Examiner
UNITED STATES PATENTS

| | | | |
|---|---|---|---|
| 3,060,712 | 10/1962 | Sisson | 68—23 |
| 3,087,321 | 4/1963 | Brucken | 68—23 |
| 3,091,956 | 6/1963 | Brucken et al. | 68—23 |
| 3,165,911 | 1/1965 | Sisson | 68—23 |

DAVID J. WILLIAMOWSKY, *Primary Examiner.*